W. A. Munn.
Tea Kettle.
No 61,853. Patented Feb. 5, 1867.
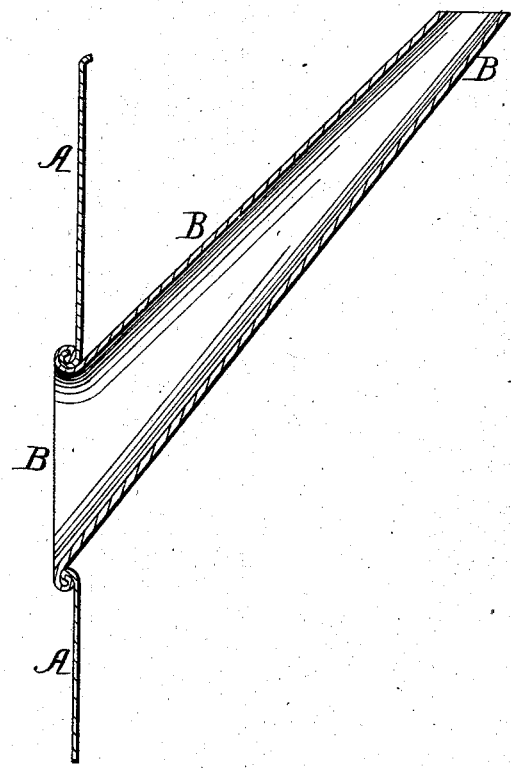
Witnesses:
F. A. Jackson
Wm. Trewin
Inventor.
Wm. A. Munn
Per Munn & Co.
Attorneys

United States Patent Office.

WILLIAM A. MUNN, OF MILWAUKEE, WISCONSIN.

Letters Patent No. 61,853, dated February 5, 1867.

---

IMPROVED MODE OF ATTACHING SPOUTS TO SHEET-METAL VESSELS.

The Schedule referred to in these Letters Patent and making part of the same.

---

TO ALL WHOM IT MAY CONCERN:

Be it known that I, WILLIAM A. MUNN, of Milwaukee, in the county of Milwaukee, and State of Wisconsin, have invented a new and useful Improvement in Tea-Kettles, etc.; and I do hereby declare that the following is a full, clear, and exact description thereof, which will enable others skilled in the art to make and use the same, reference being had to the accompanying drawing, forming part of this specification, in which—

The figure is a vertical section of the front side of a tea-kettle illustrating my improvement.

In the ordinary manner of attaching spouts to sheet metal tea kettles, coffee-pots, tea-pots, etc., the spouts are secured to the side of the vessel, around a hole through the said side, with soft solder. In this case the hole through the side of the vessel must be smaller than the lower end of the spout, so that the edge of the spout may have a foundation to rest against to be soldered. The inwardly-projecting edge of the side of the vessel thus forms a recess around the lower end of the spout in which the water or moisture collects, and from which it is impossible to remove it. This moisture acts upon the cut edge of the sheet metal and corrodes it, soon causing a leak. Another objection to this manner of attaching the spout is, that if the vessel is exposed to too great a heat, or left with too small a quantity of water in it, the spout is liable to be melted off. The spout is also liable to be knocked off by an accidental blow.

My invention has for its object to avoid these objections; and it consists in attaching the spout to the side of the vessel with a double seam, as hereinafter more fully described.

A represents the side of the vessel to which the spout is to be attached, and B is the spout. The lower edge of the spout and the edge of the hole in the side of the vessel are attached to each other in a double seam. The seam should then be pressed close and flat. This construction leaves the channel through the spout perfectly smooth and free, no cavities being formed to receive and retain water or moisture. It also makes a very strong connection, so that it is not liable to be broken off by an accidental blow. Nor can the spout be melted off by being exposed to too great heat, as no solder is used in forming the seam.

This improvement is designed to be applied to all vessels having spouts, when made of tin, copper, or brass, or any other sheet metal, whether said vessels are to be used over the fire or not.

Having thus described my invention, I claim as new, and desire to secure by Letters Patent—

Attaching the spout to the body of a sheet-metal vessel with a double seam, substantially as herein shown and described.

W. A. MUNN.

Witnesses:
CHAS. P. ROMADKA,
T. BARNES KING.